Figure 1:
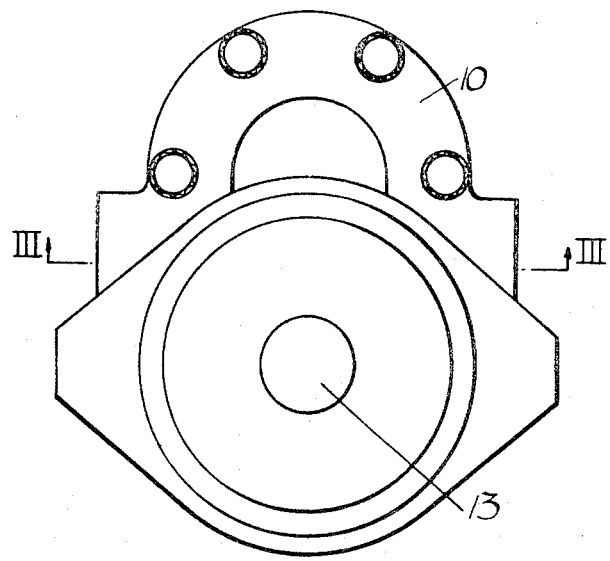

Oct. 4, 1966     H. S. BOTTOMS     3,276,387
GEAR PUMPS

Filed Aug. 17, 1964     3 Sheets-Sheet 1

Oct. 4, 1966

H. S. BOTTOMS 3,276,387

GEAR PUMPS

Filed Aug. 17, 1964

3 Sheets-Sheet 2

Oct. 4, 1966 H. S. BOTTOMS 3,276,387
GEAR PUMPS
Filed Aug. 17, 1964 3 Sheets-Sheet 3

United States Patent Office 3,276,387
Patented Oct. 4, 1966

3,276,387
GEAR PUMPS
Harry Simister Bottoms, Solihull, England, assignor to Joseph Lucas (Industries) Limited, Birmingham, England
Filed Aug. 17, 1964, Ser. No. 390,029
1 Claim. (Cl. 103—126)

This invention relates to gear pumps of the kind comprising a housing, a pair of meshing toothed wheels mounted for rotation in the housing, an inlet port in the housing at one side of the point of interengagement of the teeth of the pair of wheels, and an outlet port in the housing at the other side of said point.

When the inlet port of such a pump is connected to a source of liquid, rotation of the wheels in one direction will cause the liquid to be drawn through the inlet port into the housing and carried round in the pockets between adjacent teeth of both wheels and the housing before discharge through the outlet port. The liquid is drawn into the housing due to the increasing free space within the housing adjacent the inlet port as the teeth of the two wheels move out of engagement, and is discharged due to the decreasing free space within the housing adjacent the outlet port as the teeth move into engagement, the inlet and outlet ports being substantially isolated from one another by the small clearances between the teeth of the wheels and the housing.

When such a pump is operating at high speed, if the inlet port does not extend throughout a sufficiently long arc of both wheels, insufficient time will be given for the free spaces to fill, with the result that cavitation tends to occur, and the efficiency of the pump be impaired. However, at high speeds, there are considerable centrifugal forces acting on the liquid as it is carried around within the pockets, and, if these forces are permitted to oppose filling, the efficiency of the pump will again be impaired.

The object of the invention is to provide a convenient construction whereby cavitation within the pump and back pressure at the inlet port due to centrifugal forces can be minimised.

According to the invention a pump of the kind specified is characterized in that the inlet port is formed in a wall of the housing presented to the sides of the wheels, and has a cross-sectional shape which provides a main portion adjacent the sides of those teeth moving out of engagement with one another, and a pair of arcuate branches extending from the main portion beside the teeth of the two wheels respectively, each branch having an outer edge which tapers towards the root circle of the adjacent wheel.

Figure 2:
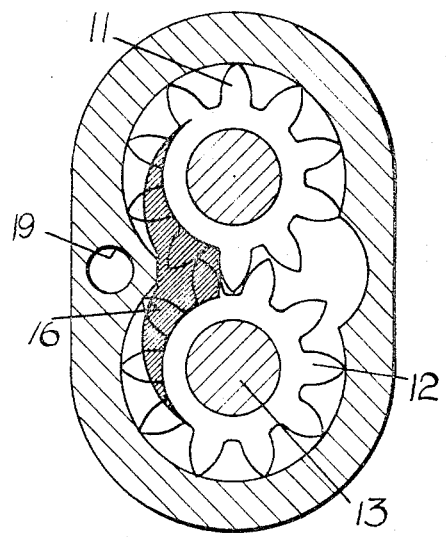
Figure 3:
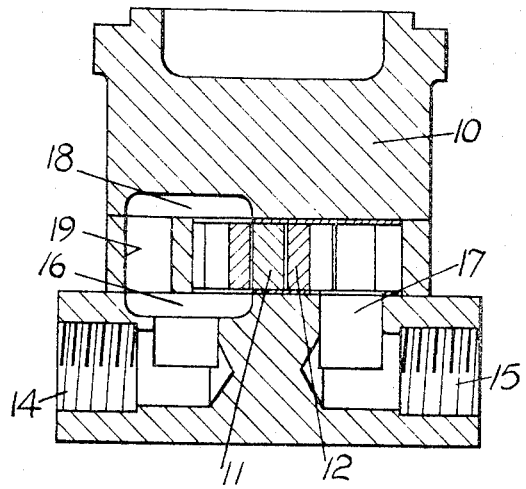
Figure 4:
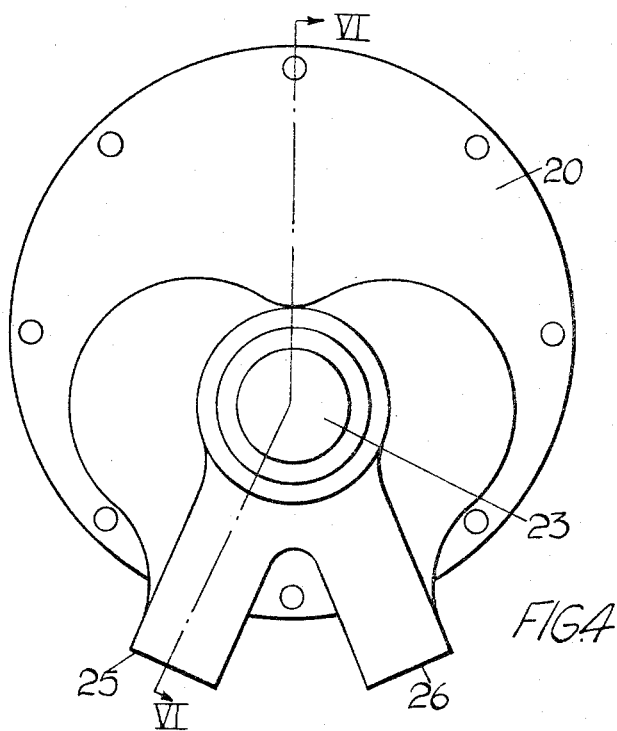
Figure 5:
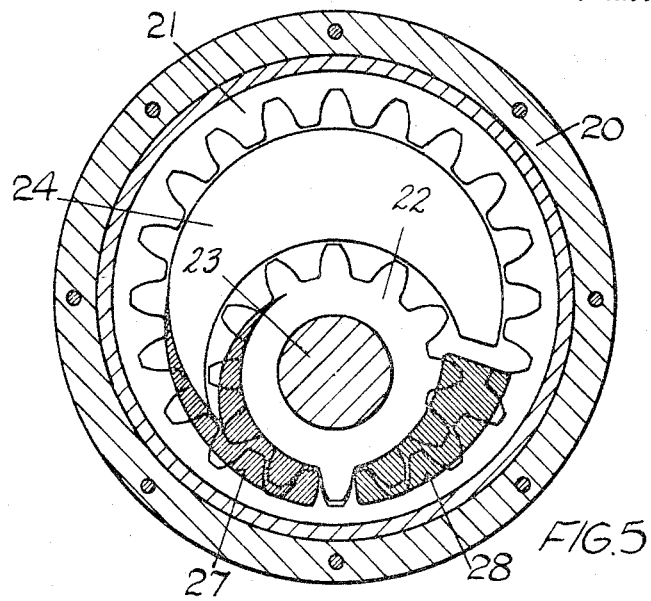
Figure 6:
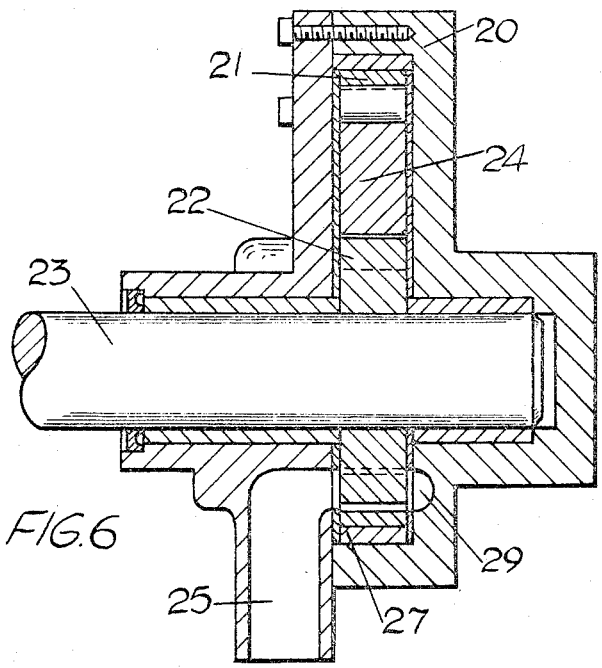

In the accompanying drawings there are illustrated two embodiments of the invention and in the drawings:

FIGURE 1 is a front view of a first form of pump incorporating the present invention, FIGURE 2 is a cross-sectional view showing the interior, and FIGURE 3 is a cross-sectional view on the line 3—3 in FIGURE 1, FIGURES 4, 5 are views corresponding to FIGURES 1 and 2 showing a second form of pump constructed in accordance with this invention, and FIGURE 6 is a cross-sectional view on the line 6—6 in FIGURE 4.

Referring to the example shown in FIGURES 1, 2 and 3 there is provided a pump having an oval housing 10 defining therein a chamber substantially in the form of a figure "8." Within the two loops of the figure "8" respectively are a pair of similar pinions 11, 12 which are in mesh with one another, the width and radii of the pinions being such that they substantially fill the chamber, leaving only a small clearance therebetween. One of the pinions 12 is formed or mounted on a driving shaft 13 extending through one side of the casing 10, whilst on opposite sides of the casing 10 are an inlet 14 and an outlet 15. The inlet and outlet communicate with ports 16, 17 which open into the chamber at points at opposite sides respectively of the interengaging teeth of the pinions 11, 12 as seen in FIGURE 3.

The pump thus far described is, of course, well known, but in applying the present invention to such a pump, the inlet port (where it opens into the chamber) has a cross-sectional shape which is indicated by the shading in FIGURE 2, this port defining a main portion with a pair of oppositely extending generally arcuate and tapering branches extending therefrom.

The main portion is situated immediately beside the point where the teeth of the pinion are coming out of engagement when the pump is in operation, and the branches extend away from the point of engagement beside the teeth of the pair of pinions respectively. The inner edge of each branch has an arc of curvature struck from the centre of, and of equal radius to the pinion beside which it extends, so that it extends beside the roots of the pinion teeth; the branch together with the main portion subtending an angle of approximately 130°. The outer edge of the branch tapers towards the root circle of the pinion so that it becomes gradually further from the tips of the pinion teeth towards the extremity of the branch. Thus the pockets formed between adjacent teeth and the housing have gradually diminishing communication with the inlet port 16 as they move from the point of tooth interengagement, and the depth of the closed portion of the pocket increases. Since centrifugal forces will tend to throw liquid in the pocket outwardly into the closed portion, any back pressure at the inlet port will be minimised whilst filling of the pockets can take place during movement through approximately 130°.

In order that liquid shall enter the pockets between adjacent teeth from both sides of the pinions, a cavity 18 is formed on the opposite side from the inlet 16 proper. This cavity 18 and the inlet 16 are furthermore in communication with each other through a bore 19 in the body 10. The cavity is of similar shape to that of the inlet 16 itself.

Referring now to the pump shown in FIGURES 4, 5 and 6, there is provided a cylindrical housing 20 in which an internally toothed annulus 21 fits with small clearance. Meshing with the teeth of the annulus is a relatively eccentric pinion 22 mounted on a driving shaft 23. The space between the pinion and annulus is filled by a crescent-shaped part 24 fixed to the housing. As in the previously described construction, an inlet 25 and an outlet 26 are provided in the housing 20 and communicates with the chamber defined within the housing through inlet and outlet ports 27, 28 at opposite sides of the interengaging teeth, the shapes of these ports being indicated by the shaded areas in FIGURE 5 respectively.

In this construction the inlet port 27 defines a main portion beside the teeth which, when the pump is in operation, will be moving out of engagement. However, the two arcuate and tapering branches curve in the same direction. The one branch, as before, has an inner edge with an arc of curvature which is struck from the centre of the pinion 22, the radius of this edge being equal to the radius of the roots of the pinion teeth. The inner edge of the other branch has an arc of curvature struck from the centre of the annulus 21, and a radius equal to the radius of the tips of the annulus teeth.

In this construction, the branch extending beside the pinion 22, together with the main portion of the port, subtends an angle of approximately 135°, whilst the branch extending beside the annulus teeth together with the main portion subtends an angle of approximately 82°, since the annulus will, in use, be rotating more slowly than the pinion.

In order that liquid shall enter between the teeth from both sides of the pinion, there is a cavity 29 of similar shape to that of the inlet 27.

Having thus described my invention what I claim as new and desire to secure by Letters Patent is:

A gear pump comprising a housing, a pair of meshing toothed wheels mounted for rotation within the housing, the housing having a wall presented to the sides of the wheels in which is formed an inlet port at one side of the point of interengagement of the teeth of the pair of wheels, and an outlet port at the other side of said point, said inlet port having a cross-sectional shape which provides a main portion adjacent to the sides of the teeth moving out of engagement with one another, and a pair of arcuate branches extending from the main portion beside the teeth of the two wheels respectively, each branch having an outer edge which tapers towards, and at its extremity joins a circle passing through the radially inner extremities of the teeth of the wheels, and having an inner edge which follows said circle.

References Cited by the Examiner
UNITED STATES PATENTS

| | | | |
|---|---|---|---|
| 2,424,750 | 7/1947 | Heckert | 103—126 |
| 2,433,360 | 12/1947 | Haight | 103—126 |
| 2,440,986 | 5/1948 | Teeter | 103—126 |
| 2,966,118 | 12/1960 | McAlvay | 103—126 |
| 3,075,470 | 1/1963 | Wood | 103—126 |
| 3,204,564 | 9/1965 | Eltze | 103—126 |

CARLTON R. CROYLE Acting Primary Examiner.

WILBUR J. GOODLIN, Examiner.